United States Patent [19]

Ezis et al.

[11] 4,125,592
[45] Nov. 14, 1978

[54] METHOD OF FORMING A SILICON NITRIDE ARTICLE

[75] Inventors: Andre Ezis, Grosse Ile, Mich.; John J. Schuldies, Phoenix, Ariz.

[73] Assignee: Ford Motor Company, Dearborn, Mich.

[21] Appl. No.: 859,500

[22] Filed: Dec. 9, 1977

Related U.S. Application Data

[63] Continuation-in-part of Ser. No. 710,822, Aug. 2, 1976, abandoned.

[51] Int. Cl.² .............................................. C01B 21/06
[52] U.S. Cl. .................................. 423/344; 106/73.5; 264/64; 264/65; 264/66
[58] Field of Search ............... 423/344, 409; 106/73.5; 264/64, 65, 66

[56] References Cited

U.S. PATENT DOCUMENTS

3,726,643   4/1973   Merzhana et al. ............... 423/344 X

FOREIGN PATENT DOCUMENTS

46-3,262   1/1971   Japan ........................ 423/344

*Primary Examiner*—Jack Cooper
*Attorney, Agent, or Firm*—William E. Johnson; Keith L. Zerschling

[57] ABSTRACT

A method for forming a silicon nitride article is set forth. An article having silicon particles therein is formed in a manner which provides a degree of porosity for the article. The silicon particles of the article are reactable with nitrogen to form silicon nitride. The article is heated to a temperature below a significant reaction temperature at which nitrogen gas reacts with the silicon particles at a measurable rate. The article is surrounded with an atmosphere containing nitrogen gas. A reaction zone is established on at least a portion of the surface area of the article. The reaction zone has a temperature above the significant reaction temperature whereby the silicon particles in the reaction zone are reacted at a measurable rate with the nitrogen gas to form silicon nitride. The reaction zone is moved in a controlled manner from the surface of the article into the interior of the article whereby the article is progressively nitrided inwardly into its bulk from the surface thereof.

6 Claims, 3 Drawing Figures

METHOD OF FORMING A SILICON NITRIDE ARTICLE

This application is a continuation-in-part of our prior application Ser. No. 710,822 filed Aug. 2, 1976 now abandoned and entitled "Method of Forming a Silicon Nitride Article."

BACKGROUND OF THE INVENTION

In general, there are two manufacturing techniques employed in the production of silicon nitride articles. These two techniques are hot-pressing and reaction sintering. Hot-pressing of silicon nitride powder yields simple shapes of silicon nitride having a density of 95 to 100% of theoretical. Reaction sintering is a more versatile manufacturing technique. Complex shapes can be formed from silicon particles by such techniques as slip casting and injection molding. For example, in a slip casting technique, silicon particles are initially cast into an article of desired shape. This article is then converted to silicon nitride in a reaction sintering operation in which the article is heated to a high temperature in the presence of nitrogen.

Conventional nitriding techniques require the introduction of the article of silicon particles formed in a shaping operation into an atmosphere containing nitrogen gas. The article is heated to a temperature above a significant reaction temperature at which the silicon and nitrogen can react to form silicon nitride at a measurable rate. This nitriding technique requires porosity in the article of silicon particles so that all of the silicon particles are accessible to the nitrogen gas atmosphere. However, as the nitriding reaction progresses from the surface of the article inwardly, the porosity of the article must be maintained to insure complete nitridation of all the silicon particles.

If portions of the silicon body are not accessible to nitrogen gas, the resultant product is a matrix of silicon nitride with islands of unreacted silicon. This condition usually occurs when conventional nitriding techniques are employed on articles in an attempt to manufacture articles having final densities higher than 2.70 grams/cc. Having free silicon in an article is deleterious to the final silicon nitride product. Having silicon is deleterious in that the thermal shock properties, oxidation resistance and high strength properties are all reduced over that which would be obtainable if all of the silicon was properly nitrided.

It is a principal object of this invention to provide a method of nitriding silicon which is effective in nitriding substantially all of the silicon found in an article.

Those skilled in the art, of course, know that the rate at which silicon reacts with nitrogen gas is temperature dependent. In accordance with this temperature dependency, we have found that a temperature of at least 1800° F. is required as a significant reaction temperature in order to obtain a measurable rate of reaction of silicon and nitrogen. By a measurable rate of reaction we mean that a reasonable amount of silicon reacts with the nitrogen during a reaction period of one hour. For example, if a unit of silicon particles is exposed to nitrogen gas at a temperature above a significant reaction temperature of 1800° F., 5–20% thereof would react during the first hour of exposure.

We have found that the most desirable temperature for the reaction is a temperature in a range from 2400° F. to 2500° F. One does not want to exceed 2600° F. as this is the melting temperature of silicon. If one exceeds 2600° F., the silicon particles have a tendency to melt and coalesce forming large zones of silicon which are impossible to nitride because they are not permeable to the nitrogen. Therefore, in accordance with this specification, we define a significant reaction temperature as being a temperature in the range from 1800° F. to 2600° F., and preferably in the range from 2400° F. to 2500° F.

SUMMARY OF THE INVENTION

This invention relates to a method of forming a silicon nitride article, and more particularly, to a method of forming a silicon nitride article in which a nitriding operation carried out upon silicon particles contained in the article is effective to convert substantially all of such particles to silicon nitride.

In accordance with the general teachings of the method of this invention, an article is formed having silicon particles therein. The article is fabricated in a process which permits the article to be formed with less than full density whereby the article has at least a degree of porosity therein which permits the penetration thereof by nitrogen gas. The article is heated to a temperature below a significant reaction temperature at which nitrogen gas reacts with silicon particles at a measurable rate. The article is surrounded with an atmosphere containing at least some nitrogen gas. A reaction zone is established on at least a portion of the surface area of the article. The reaction zone has a temperature above the significant reaction temperature of silicon particles and nitrogen gas whereby the silicon particles in the reaction zone can react with the nitrogen gas to form silicon nitride. The reaction zone is moved from the surface of the article into the interior of the article in a controlled, progressive manner whereby the article is progressively nitrided inwardly into its bulk from the surface thereof. This technique allows nitrogen gas to flow through the still porous rear portion of the article while the front portion thereof is being nitrided.

In accordance with specific teachings of one embodiment of the method of this invention, the reaction zone is moved from the surface of the article into the interior of the article in a controlled manner by gradually increasing the temperature of the portion of the surface area of the article upon which the reaction zone was established. In another embodiment of the method of this invention, the reaction zone is moved from the surface of the article into the interior of the article in a controlled manner by increasing the temperature of the portion of the surface area of said article upon which said reaction zone was established in a step-wise fashion in predetermined increments after predetermined lengths of time.

DESCRIPTION OF THE PREFERRED EMBODIMENT

Figure 1:
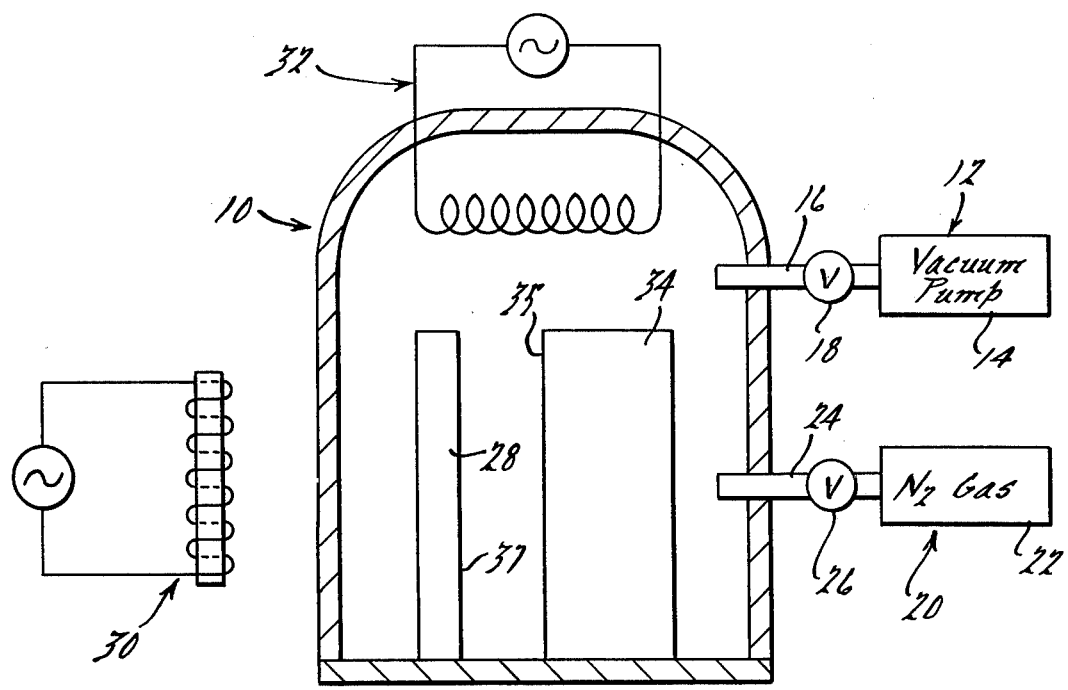
FIG. 1 is a schematic drawing of apparatus suitable for carrying out the method of this invention.

In FIG. 1 there is seen a closed chamber generally identified by the numeral 10. This chamber has associated with it a vacuum system generally identified by the numeral 12. The vacuum system includes a vacuum pump 14, a vacuum line 16 and a valve 18. The chamber also has associated therewith a nitrogen gas supply system generally identified by the numeral 20. This system includes a source of nitrogen gas 22, a nitrogen feed gas line 24 and a valve 26.

Inside the closed chamber 10 there is positioned an inductively heatable susceptor 28. An inductive heating unit generally identified by the numeral 30 is provided outside of the closed chamber. As is known in the art, the development of an alternating magnetic field by the inductive heating unit brings about a rise in the temperature of the susceptor within the chamber. An auxiliary electrical heating source generally identified by the numeral 32 may also be provided to assist in heating the chamber. The closed chamber 10 confines therewithin a silicon particle compact 34. This compact has at least one face 35 or portion thereof in facing relationship to a face 37 of the susceptor. The face 37 of the susceptor radiates heat to the face 35 of the silicon compact.

The silicon compact 34 may be formed in any process which leaves behind an article containing a substantial quantity of silicon particles as well as an article of less than full density. If the article is less than full density, then the article has a degree of porosity therein which permits nitrogen gas to flow through the article in order to be in a position to react with the silicon particles. Suitable processes for producing the silicon compact include those well known in the art, as for example, slip casting of silicon particles or injection molding of such particles with a binder which is subsequently removed prior to a nitriding operation. The compact should be sufficiently porous so that nitrogen gas has an opportunity to come into the vicinity of all the silicon particles contained therein. The compact may be presintered in argon to increase the handling strength thereof.

After the silicon compact 34 has been formed, it is placed in the closed chamber 10. The chamber is evacuated by opening valve 18 and actuating vacuum pump 14 which operates through vacuum line 16 to remove all the air from the closed chamber. During the removal of air, the auxiliary electrical heating source 32 may be actuated to heat the chamber to a temperature slightly below a significant reaction temperature at which silicon particles react with nitrogen gas, that is, a temperature slightly below 1800° F. The auxiliary electrical heating source may be used to bring the compact to this temperature or, in the alternative, the inductive heating unit 30 working through the susceptor 28 may heat the chamber to its proper temperature. We prefer to use the two heating systems to bring the chamber to proper temperature. As the significant reaction temperature of silicon and nitrogen is approached, the vacuum pump 14 is turned off and the valve 18 closed to the vacuum system 12. The source of nitrogen gas 22 of the nitrogen gas supply system 20 is then coupled to the interior of the closed chamber 10 by opening valve 26 and allowing nitrogen gas to pass into the chamber through the nitrogen feed gas line 24. A positive pressure of nitrogen gas can be established within the chamber and then the valve 26 is closed.

Figure 2:
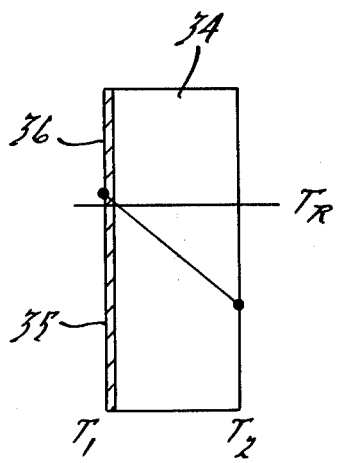
FIG. 2 is a schematic representation of the initiation of the method of this invention.
Figure 3:
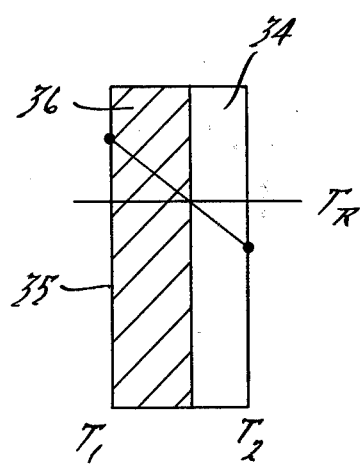
FIG. 3 is a schematic drawing illustrating the progress of the method of this invention to obtain a fully nitrided article.

The silicon compact 34 is now surrounded by nitrogen gas and because of the compact's porosity, the nitrogen gas can penetrate into the compact to be available to react with the silicon particles. The inductive heating unit 30 is operated to increase the temperature of the susceptor 28 so that by radiation from its face 37 it heats the face 35 of the compact to a temperature above the significant temperature at which silicon reacts with nitrogen gas to form silicon nitride. This condition is illustrated in FIG. 2 in which $T_r$ represents the reaction temperature. It should be noted that a small band or zone 36 of silicon nitride is formed at and slightly below the surface once this zone is heated to a temperature above the significant reaction temperature. The pressure of the nitrogen gas in the chamber can be monitored. As the pressure falls off one knows that the reaction is going forward. Within a finite increment of time, the pressure of nitrogen will once again stabilize which means that the reaction of silicon and nitrogen in this first zone is substantially complete. At this point in time, the power of the inductive heating unit 10 is increased so as to increase the temperature of the susceptor 28 which again increases the surface temperature of the silicon compact thereby causing an increase in the temperature at and below the surface of the compact which brings another zone of the material to a temperature above the significant reaction temperature permitting a second zone of reaction. This process is repeated in a stepwise fashion and the zone of reaction in the silicon compact gradually moves across the compact from the surface thereof into its bulk. The progress of the reaction is illustrated in FIG. 3 which shows the reaction zone as having moved across a substantial portion of the compact. As will be noted, more than half of the compact now has a temperature above the significant reaction temperature. The unreacted rear portion of the compact material is still sufficiently porous to permit the flow of nitrogen gas into the compact to the zone at which the reaction is being carried out.

Rather than carrying out the nitriding operation in a controlled, differential or stepwise fashion, the power to the inductive heating unit 10 may be continuously increased at a slow rate thereby continuously increasing the temperature of the face 35 of the silicon compact 34. The slow, continuous increase in temperature in the surface of the compact is transmitted into the interior of the compact whereby a reaction line may be visualized as the line movement of the reaction zone into the compact as the temperature of the compact progressively rises to a temperature above the significant reaction temperature.

In either the stepwise or continuous process, the heating of the face 35 of the silicon compact 34 is continued until such time as the reaction temperature has moved from the front face to the rear face of the body thus providing a complete nitriding of the compact.

The general method of this invention has been disclosed. There are many alternate ways one may carry out some of the processing as will be discussed below. As previously stated, the entire closed chamber 10 may be brought to an initial temperature slightly below the significant silicon-nitrogen reaction temperature by both power sources. After the chamber has reached such a temperature, the inductive heating unit 10 takes over to induce the temperature gradient in the silicon compact 34. On the other hand, one may inductively heat the compact from room temperature to the significant reaction temperature with a temperature gradient being induced in the compact throughout the entire heating period. Another technique may involve using cyclical heating to maintain a suitable temperature gradient.

The silicon compact 34 may also be pre-nitrided in a conventional nitriding operation and then have the finished nitriding thereof be carried out by the method of this invention. The only requirement is that the pre-nitrided compact still be sufficiently porous that nitrogen gas can penetrate into it to react with the available silicon.

The temperature gradient across the silicon compact 34 may be established by means other than inductively heating. For example, the face of the compact to be heated to the higher temperature may be heated in an operation as layer heating. Also, more than one face of the compact may be heated in such a manner so long as there is at least one face or surface area of the compact open through which nitrogen gas can penetrate into the compact to the reaction zone.

U.S. Pat. No. 3,726,643 was cited in the prosecution of our prior application Ser. No. 710,822. This patent teaches the reaction of a metal such as silicon with nitrogen by using a short time (2-10 seconds) ignition source. When the source ignites, sufficient heat energy is formed on a face of the metal compact to start the reaction between the metal and the nitrogen. This reaction is exothermic in nature and will produce additional heat which causes the reaction to cascade through the compact.

If the technique was employed for the nitriding of a high density compact of silicon metal, very little nitriding would occur. The nitriding kinetics for silicon is extremely slow. For example, conventional nitriding practices require approximately five to eight days to nitride a compact having a cross section of one-half inch. In addition, investigators (Atkinson, A., Evans, A. D., "Temperature Gradients in Nitriding Silicon Powder Compact", Journal of British Ceramic Society, Volume 72, 1974) have shown that the exotherm produced by the reaction of silicon and nitrogen must be controlled to nitride properly a silicon metal compact. If not controlled, complete nitriding is impossible due to melting and coalescence of silicon metal because of the high temperatures produced. Therefore, the teachings in the U.S. Pat. No. 3,726,643 patent would not only produce little nitriding, but would also, due to the exotherm, cause silicon metal to melt and coalesce. This type of product is not suitable for high temperature structural ceramic applications.

In accordance with our teachings, it is apparent that we are not attempting to allow the reaction between silicon and nitrogen to cascade through the compact by way of a natural exothermic heat source. We are attempting to nitride progressively through the compact in an orderly fashion and attempting to minimize the effects of the exotherm, that is, controlling the exotherm by controlling the amount of silicon subjected to the reaction, controlling the amount of nitrogen available for reaction, and the temperature of the reaction zone.

As an illustration of our method, a one cubic inch compact having a silicon metal green density of 1.92 grams per cc and having no silicon metal particles therein larger than 0.0024 inches, requires that the reaction zone not exceed 0.025 inches when one face is heated. The time required to fully nitride this section (0.025 inch × 1 inch × 1 inch) is approximately one hour at a temperature of 2550° F.

As is known to those skilled in the art, the various factors which must be taken into consideration in nitriding are such things as the size of the heated surface, the mass of the silicon in the reaction zone, the size of the largest particle in that zone, and the temperature of the zone. For example, lower temperatures require longer times and smaller particle sizes are easier to nitride. Thus, one would adjust the rate of progress of the nitriding cycle in accordance with these factors.

There has been disclosed herein a method of nitriding a silicon compact which produces a final article of almost theoretically dense silicon nitride. Those skilled in the art, in view of this specification, will be able to develop alternatives to the method of this invention which fall within the spirit and scope of this invention. It is intended that all such alternatives be included within the scope of the appended claims.

What we claim is:

1. A method of forming a silicon nitride article which comprises:

forming a silicon particle compact, said compact being less than full density whereby said compact has at least a degree of porosity to permit nitrogen gas to come into the vicinity of all the silicon particles contained therein;

placing said compact in a nitrogen gas containing environment;

heating said compact to a temperature just below a significant reaction temperature at which silicon reacts with nitrogen gas at a measurable rate to form silicon nitride said significant reaction temperature being 1800° F.;

selectively heating only a portion of the surface area of said compact to a temperature above said significant reaction temperature, but below 2600° F. said selective heating being carried out in a manner such that the bulk of said compact at least initially remains at a temperature below said significant reaction temperature whereby the silicon, nitrogen reaction takes place at a measurable rate only in said selectively heated area;

increasing the temperature of said selectively heated portion of the surface area of said compact so that the temperature of adjacent portions of the compact moving into the bulk of the compact from the surface area are heated to a temperature above said significant reaction temperature whereby the reaction of silicon and nitrogen progresses into the bulk of the compact; and continuing the increase of the temperature of said selectively heated portion of said compact in a manner which causes the reaction zone of silicon and nitrogen to progress inwardly from the surface of said compact to the bulk of the article because the temperature along a reaction line from the surface of said compact into the bulk thereof is progressively and gradually raised to a temperature above said significant reaction temperature to effect the nitriding of substantially all of the silicon in said compact.

2. The method of claim 1 wherein: the temperature of said selectively heated portion of the surface area of said compact is gradually increased in uniform manner so that said reaction zone is gradually moved from the surface of said compact into the bulk thereof.

3. The method of claim 1 wherein: the temperature of said selectively heated portion of the surface area of said compact is increased in a stepwise fashion in predetermined increments after predetermined lengths of time so that said reaction zone is moved in a differential fashion from the surface of said compact into the bulk thereof.

4. The method of claim 1 wherein: the portion of the surface area selectively heated includes at least two separate zones on said compact.

5. The method of claim 1 wherein: said formed compact is presintered in argon prior to being heated thereby to increase the handling strength thereof.

6. The method of claim 1 wherein: said formed compact is initially subjected to a nitriding operation prior to being subjected to said selective heating of a portion of the surface area thereof.

* * * * *